United States Patent [19]

Lat et al.

[11] Patent Number: 5,033,181
[45] Date of Patent: Jul. 23, 1991

[54] METHOD FOR MANUFACTURING NAILS

[75] Inventors: Geronimo Lat, Prospect Heights; William L. Gabriel; David Heminger, both of Barrington; Lawrence S. Shelton, Morton Grove, all of Ill.

[73] Assignee: Illinois Tool Works Inc., Glenview, Ill.

[21] Appl. No.: 535,015

[22] Filed: Jun. 8, 1990

[51] Int. Cl.$^5$ .......................... B23P 19/04; B21G 3/20
[52] U.S. Cl. ........................................ 29/433; 10/54; 29/458
[58] Field of Search .................. 10/34, 41, 42, 43, 54, 10/DIG. 4; 29/433, 458, 460; 206/343, 345; 411/446, 439, 483, 902, 903, 914; 427/300, 435

[56] References Cited

U.S. PATENT DOCUMENTS

| | | | |
|---|---|---|---|
| 2,718,647 | 9/1955 | Raible | 10/54 |
| 3,083,369 | 4/1963 | Peterson | 206/345 X |
| 3,451,839 | 6/1969 | Cauvin | 427/300 X |
| 4,114,505 | 9/1978 | Loeser et al. | 411/903 X |
| 4,679,975 | 7/1987 | Leistner | 411/903 X |

Primary Examiner—E. Michael Combs
Attorney, Agent, or Firm—Schwartz & Weinrieb

[57] ABSTRACT

Nails suitable for outdoor use, such as, for example, roofing nails, are formed from carbon steel wire pre-coated with a metallic layer, which has corrosion-resistant properties, such as, for example, a zinc layer applied by pre-galvanizing the stock carbon steel wire. Each nail is formed with a shank and with a head. The metallic layer is discontinuous within a region formed upon the head of each nail. The nails are collated by means of collating wires welded to the shanks of the nails. The collated nails are coiled. The coiled nails are cleaned in a cleaning bath, such as, for example, 1,1,trichloroethane. The cleaned nails are coated with a polymeric layer, which covers the region of the head of each nail where the metallic layer is discontinuous, thus restoring the corrosion-resistant properties of the nails.

11 Claims, 1 Drawing Sheet

METHOD FOR MANUFACTURING NAILS

TECHNICAL FIELD OF THE INVENTION

This invention pertains to the manufacture of nails suitable for outdoor use, such as, for example, roofing nails, from pre-galvanized or pre-chromated, carbon steel wire, wherein the nails are treated after the formation thereof by means of an additional process step so as to restore or enhance their corrosion resistance which may have been somewhat comprised during the nail formation step of the overall process from the stock pre-galvanized or pre-chromated carbon steel wire.

BACKGROUND OF THE INVENTION

Commonly, roofing nails and other nails intended for outdoor use are formed from carbon steel wire. It is necessary to protect such nails against corrosion.

It is conventional to galvanize such nails, in a batch process, after such nails have been formed. It is known, moreover, to coat the galvanized nails with a polymeric material, which provides further protection against corrosion.

Because galvanizing in a batch process is expensive and difficult to implement, it would be highly desirable to eliminate any need to galvanize such nails after such nails have been formed, while still achieving the desired corrosion resistance for the nails.

SUMMARY OF THE INVENTION

This invention provides a method for manufacturing nails suitable for outdoor use, such as, for example, roofing nails, without any need for galvanizing the nails after the nails have been formed from carbon steel wire. The desired corrosion resistance is achieved by forming the nails from carbon steel wire pre-coated with a protective, metallic layer, such as, for example, pre-galvanized, carbon steel wire, and thereafter treating the nails so as to restore the corrosion resistance of those portions of the nail which are no longer covered by means of the protective, metallic layer as a result of the formation of the nails from the stock or basic pre-galvanized carbon steel wire.

Carbon steel wire coated with a metallic layer, such as, for example, pre-galvanized, carbon steel wire or prechromated, carbon steel wire, is provided. Pregalvanized, carbon steel wire is preferred. Nails are formed from such wire, such as, for example, means of a known nail-forming machine. Each nail is formed with a shank and a head.

While conventional forming processes are desirably economical, the nails are formed thereby in such a manner that the head of each nail has a region where the protective, metallic layer is discontinuous. The region where the protective, metallic layer is discontinuous may be conveniently described as a window in the protective, metallic layer. For outdoor use, it is desirable to restore the corrosion resistant properties of the nails, particularly where the protective, metallic layer is discontinuous.

To this end, at least the head of each nail is coated with a protective, polymeric layer, which covers the window previously formed in the protective, metallic layer on the head of each nail. Preferably, substantially all portions of each nail are coated with the protective, polymeric layer. It is preferred, moreover, to clean each nail at least in those regions where such nail is to be coated with the protective, polymeric layer, so as to thereby assure proper bonding and integrity of the protective, polymeric layer.

In a preferred mode for carrying out the method provided by means of this invention, the nails are formed from pre-galvanized, carbon steel wire and are collated by means of collating wires welded to the shanks of the nails. After the collated nails are coiled, substantially all portions of each nail are cleaned, as mentioned above. Thereupon, substantially all of each nail is coated with a protective, polymeric layer, as mentioned above, thus fully restoring and indeed enhancing the corrosion-resistant properties of the steel wire from which the nails are formed.

These and other objects, features, and advantages of this invention will become evident from the following description of a preferred mode for carrying out this invention with reference to the accompanying drawings, in which like reference characters designate like or corresponding parts throughout the several views, and wherein.

Figure 3:
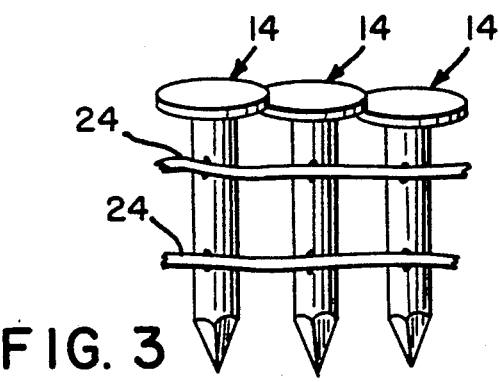

FIG. 3, on a reduced scale, is a fragmentary, perspective view of three such nails collated by means of two collating wires welded to their shanks.

Figure 4:
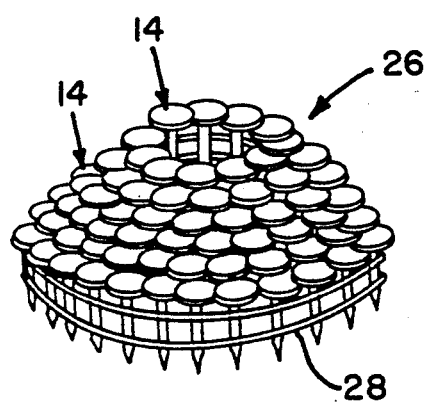

FIG. 4, on a further reduced scale, is a perspective view of a coil of such c nails.

Figure 5:
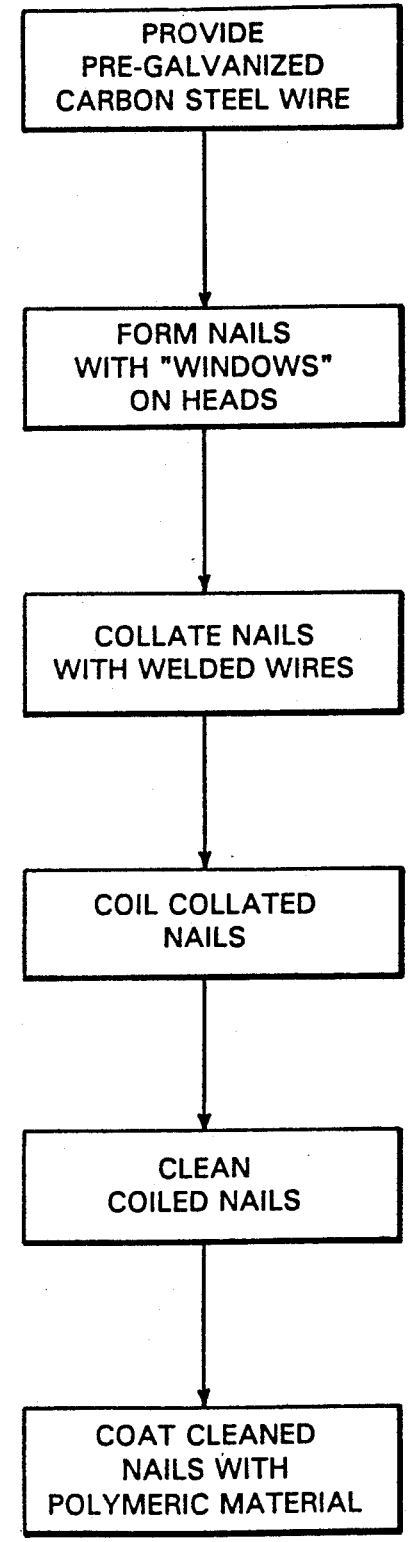

FIG. 5 is a flow chart illustrative the successive steps of a preferred mode of a method for carrying out this invention.

DETAILED DESCRIPTION OF PREFERRED MODE

A preferred mode of a method for carrying out this invention will now be described It should be understood that the mode described below is an exemplary mode for carrying out this invention and that this invention is not limited to the mode described below.

Figure 1:
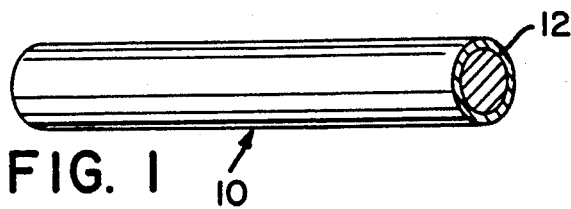
FIG. 1 is a fragmentary, perspective view of an indeterminate length of pre-galvanized, carbon steel wire.

As shown in FIG. 1, an indeterminate length of pre-galvanized, carbon steel wire 10 is provided. Such wire is coated with a zinc layer 12.

Figure 2:
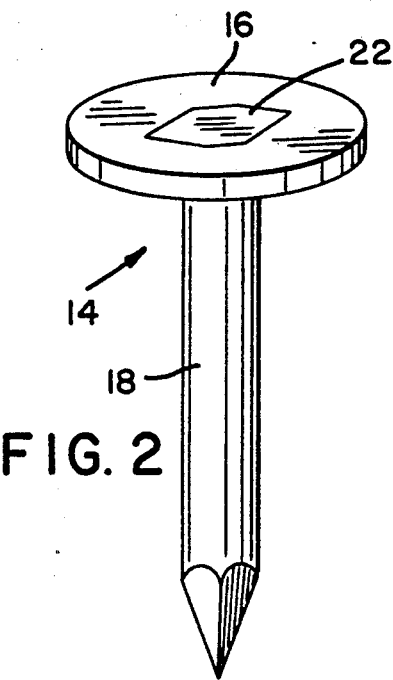
FIG. 2 is a perspective view of a roofing nail formed from such wire.

An indeterminate quantity of roofing nails are formed from the pre-galvanized wire 10/12, as exemplified by means of the roofing nails 14 shown in FIGS. 2, 3, and 4. The roofing nails 14 may be advantageously formed in a nail-forming machine of a type exemplified by means of a Wafiosx TM nail-forming machine, Model No. N5 or N6. Each roofing nail 14 is formed with a head 16 and a shank 18 having a pointed tip 20.

As shown in FIG. 2, roofing nails typically have a head which is large in relation to the shank diameter. As the head is formed, a significant amount of material is laterally displaced so as to expose the underlying steel in a region shown at 22. A "window" is thus created which is at least partially devoid of corrosion protection originally provided by means of the zinc layer 12.

As shown in FIG. 3, the roofing nails 14 are collated, in a known manner, by means of two collating wires 24 welded to the shanks 18 of such nails 14.

The collated nails 14 are coiled, in a known manner, so as to form coils exemplified by means of the coil 26 of FIG. 4. A rubber band 28 or a wire tie (not shown) is used to secure such nails 14 in such coils 26 for handling, shipping, and storage.

Prior to further treatment of the nails 14 for corrosion resistance, the individual coils 26 are cleaned within a cleaning bath of a suitable composition, such as, for example, 1,1,1 trichloroethane, which is preferred. Thus, the coiled nails 14 are cleaned, along with the collating wires 24. Such cleaning step assures the effectiveness of the subsequent corrosion-resistance treatment. Since this treatment includes the application of a protective, polymeric layer, cleaning of the coils 26 assures that the protective, polymeric layer will be effectively bonded to the metallic surfaces of the nails 14.

Thus, the present invention contemplates restoration and augmentation of the corrosion-resistant properties of the metal from which the nails 14 are formed. This restoration can be efficiently and economically achieved when the nails 14 are collated and coiled for use in automatic, pneumatically powered or combustion-powered nailing tools, since collated coils of nails can be readily handled and treated in accordance with the present invention.

After the coiled nails 14 and the collating wires 24 have been cleaned, the individual coils 26 are coated with a polymeric layer. Thus, the coiled nails 14 are coated with the polymeric layer, which covers the region or window 22 where the zinc layer 12 is discontinuous.

The individual coils 26 are coated in a coating bath of a suitable composition. A preferred composition for the coating bath is acrylic ketone base coating, as available commercially from Finnaren & Haley, Conshohocken, Pennsylvania, as #12-598.

In this manner, the protective, polymeric layer acts to restore the corrosion resistance of each nail 14 at the region 22 upon its head 16, and at any other portion of such nail 14 where the zinc layer 12 may have been adversely affected during the process of nail formation. At the same time, the protective, polymeric layer enhances and augments the corrosion resistance of the remaining portions of each nail 14, that is, those portions where the zinc layer 12 remains intact. The resultant nails 14 are particularly suited for the rigors of outdoor use.

Preferably, the individual coils 26 are moved into and out from the cleaning bath, and out into and from the coating bath, by means of a method disclosed in and by means of an apparatus disclosed in a co-pending application Ser. No. 519,435 filed on May 4, 1990, by William L. Gabriel, Geronimo E. Lat, and Dieter G. Boigk, and assigned commonly herewith, for "Workpiece-Treating System and Related Method."

Reference may be made to the co-pending application noted above for further information concerning the preferred method for moving the individual coils 26 and concerning the preferred apparatus for moving such coils 26.

Various modifications may be made in connection with the preferred mode described above for carrying out this invention, in the preferred method described in the copending application noted above, and in the preferred apparatus described in the co-pending application noted above, without departing from the scope and spirit of this invention which are defined by means of the appended claims.

We claim:

1. A method for manufacturing corrosion-resistant headed fasteners, such as roofing nails, comprising the steps of:
   (a) providing carbon steel wire coated with a protective, metallic layer, which has corrosion-resistant properties;
   (b) forming fasteners from said wire in such a manner that each fastener is formed with a shank and a head, said head being formed by lateral displacement of one end of said protected carbon steel wire such that a region of said head results where said protective, metallic layer is discontinuous and said carbon steel wire is exposed; and
   (c) restoring the corrosion-resistant properties of said fasteners by coating at least said head of each fastener with a protective, polymeric layer, which covers said region of said head of such fastener where said protective metallic layer was rendered discontinuous and said carbon steel wire was exposed.

2. The method of claim 1 wherein the coating step includes coating substantially the entire fastener with the polymeric layer.

3. The method of claim 1 comprising a step, which follows the forming step and precedes the coating step, of cleaning each fastener at least where such fastener is to be coated in the coating step.

4. The method of claim 3 wherein the cleaning step includes cleaning substantially the entire fastener and wherein the coating step includes coating substantially the entire fastener with the polymeric layer.

5. The method of claim 1 comprising a step, which follows the forming step and precedes the coating step, of collating the fasteners by means of collating wires welded to the shanks of the fasteners.

6. The method of claim 5 comprising a step, which follows the collating step and procedes the coating step, of cleaning substantially the entire fastener.

7. The method of claim 6 wherein the coating step includes coating substantially the entire fastener.

8. The method of claim 7 wherein the cleaning step includes cleaning the collating wires as well as the collated fasteners and wherein the coating step includes coating the collating wires as well as the collated fasteners.

9. The method of claim 8 comprising a step, which follows the forming step and precedes the cleaning step, of coiling the collated fasteners.

10. The method as set forth in claim 3, wherein:
said cleaning of each of said fasteners is performed by means of cleaning bath of 1,1,1 trichloroethane.

11. The method as set forth in claim 1, wherein:
said coating of said fasteners is performed by means of a coating bath of an acrylic ketone base coating.

* * * * *